United States Patent
Hugonnot et al.

(10) Patent No.: US 9,250,497 B2
(45) Date of Patent: Feb. 2, 2016

(54) METHOD AND DEVICE FOR THE OPTICAL PARAMETRIC AMPLIFICATION OF PULSES WITH FREQUENCY DRIFT

(71) Applicants: COMMISSARIAT A L'ENERGIE ATOMIQUE ET AUX ENERGIES ALTERNATIVES, Paris (FR); UNIVERSITE LILLE 1 SCIENCES ET TECHNOLOGIES, Villeneuve d'ascq Cedex (FR)

(72) Inventors: Emmanuel Hugonnot, Talence (FR); Arnaud Mussot, Hellemmes (FR); Alexandre Kudlinski, Salome (FR)

(73) Assignees: COMMISSARIAT A L'ENERGIE ATOMIQUE ET AUX ENERGIES ALTERNATIVES, Paris (FR); UNIVERSITE LILLE 1 SCIENCES ET TECHNOLOGIES, Villeneuve d'Ascq (FR)

( * ) Notice: Subject to any disclaimer, the term of this patent is extended or adjusted under 35 U.S.C. 154(b) by 0 days.

(21) Appl. No.: 14/363,413

(22) PCT Filed: Dec. 11, 2012

(86) PCT No.: PCT/EP2012/075123
§ 371 (c)(1),
(2) Date: Jun. 6, 2014

(87) PCT Pub. No.: WO2013/087645
PCT Pub. Date: Jun. 20, 2013

(65) Prior Publication Data
US 2014/0333994 A1 Nov. 13, 2014

(30) Foreign Application Priority Data
Dec. 14, 2011 (FR) ...................................... 11 61642

(51) Int. Cl.
*G02F 1/39* (2006.01)
*G02F 1/35* (2006.01)

(52) U.S. Cl.
CPC ................ *G02F 1/39* (2013.01); *G02F 1/3536* (2013.01); *G02F 1/395* (2013.01); *G02F 2001/392* (2013.01); *G02F 2201/02* (2013.01)

(58) Field of Classification Search
CPC ................................................. G02F 1/3536
USPC .......................................................... 359/330
See application file for complete search history.

(56) References Cited

U.S. PATENT DOCUMENTS 6,266,179 B1 * 7/2001 Nakamoto ..................... 359/330
6,522,818 B1 * 2/2003 Aso .......................... G02B 6/278
359/341.1

(Continued)

FOREIGN PATENT DOCUMENTS

EP        1 626 308 A1    2/2006
WO    WO 2007139272 A1 * 12/2007   ................ H01S 3/10
WO       2010/142920 A1   12/2010

OTHER PUBLICATIONS

International Search Report issued in Application No. PCT/EP2012/075123 dated Feb. 21, 2013.

(Continued)

*Primary Examiner* — Daniel Petkovsek
(74) *Attorney, Agent, or Firm* — Pearne & Gordon LLP

(57) ABSTRACT

Method and device for the optical parametric chirped pulse amplification, using two pump signals and making it possible to extend the spectral gain band.
According to the invention, which is particularly applicable to laser-matter interaction, a four-wave mixing effect is used, preferably in an optical fiber (F), between each pulse (S) and the two pump signals (P1, P2); and the half-sum (fM) of the respective optical frequencies (fP1, fP2) of these signals pertains to the pulse spectrum support.

9 Claims, 3 Drawing Sheets

(56) References Cited

U.S. PATENT DOCUMENTS

| | | | |
|---|---|---|---|
| 7,764,423 B2 * | 7/2010 | McKinstrie | G02F 1/3536 359/326 |
| 2004/0042060 A1 | 3/2004 | McKinstrie | |

OTHER PUBLICATIONS

Caucheteur C et al. "Experimental demonstration of optical parametric chirped pulses amplification in optical fiber" Optics Letters, OSA, OPtical Society of America, vol. 35, No. 11, Jun. 1, 2010.

Zhengqian Luo et al. "Multiwavelength Fiber Optical Parametric Oscillator" IEEE Photonics Technology Letters, vol. 21, No. 21, Nov. 1, 2009.

Zeromskis E. et al "Gain bandwidth broadening of the continuum-seeded optical parametric amplifier by use of two pump beams" Optics Communications, vol. 203, No. 3-6, Mar. 15, 2002.

Bigourd, et al. "Dynamics of fiber optical parametric chirped pulse amplifiers" Journal of the Optical Society of America, vol. 28, No. 11, Nov. 2011.

Bigourd, et al. "High-gain fiber, optical-parametric, chirped pulse amplification of femtosecond pulses at 1 μm" Optics Letters, vol. 35, No. 20, Oct. 15, 2010.

Preliminary Search Report for FR 1161642 dated Jun. 29, 2012.

* cited by examiner

METHOD AND DEVICE FOR THE OPTICAL PARAMETRIC AMPLIFICATION OF PULSES WITH FREQUENCY DRIFT

CROSS-REFERENCE TO RELATED APPLICATIONS

This application claims priority to PCT/EP2012/075123, filed Dec. 11, 2012 and French application FR 1161642, filed Dec. 14, 2011.

FIELD OF THE INVENTION

The present invention relates to a method and a device for the optical parametric chirped pulse amplification.

The invention particularly relates to the field of FOPCPAs i.e. fibre optical parametric chirped pulse amplifiers.

This new generation of amplifiers, due to the advantages offered by the fibre architectures in terms of size and stability, is likely to replace bulk parametric amplifiers in some cases.

The invention makes it possible to extend by a factor of 2 the (spectral) gain band of FOPCPAs and thus amplify pulses of very short duration. Gain bandwidths greater than those of fibres doped with rare earths could even be obtained, which would pave the way for ultra-wideband amplification using fully fibre-based devices. This is in line with the development of current laser systems towards fully fibre-based systems.

The invention particularly applies to the amplification of very short pulses, laser machining methods, laser-matter interaction experiments and telecommunications.

STATE OF THE RELATED ART

FOPAs, or fibre optical parametric amplifiers, experienced resounding success some years ago, in the field of optical telecommunications. Indeed, the wide gain bands thereof represent a primary interest for simultaneously amplifying the numerous channels of wavelength division multiplexed signals.

These features have also proved to be extremely advantageous for amplifying broad-spectrum pulses, which are temporally stretched in order to reduce the peak power thereof.

Indeed, to date, these chirped pulses were essentially amplified either by stimulated emission in bulk materials of fibres doped with rare earths, or in bulk amplifiers based on second-order nonlinear crystals.

These devices make it possible to obtain, after recompression, extremely strong pulses; they represent laser sources of choice.

For numerous applications, the constant search for compact designs, stability and easy alignment means fibre laser systems are preferred. However, the basic operating principle thereof requires pump energy storage inside the fibres, this energy then being yielded in spontaneous or stimulated emission form. In this way, a fluorescence signal is emitted for a sufficiently long time for the signal-to-noise ratio to be degraded.

In the case of applications requiring excellent contrast, it is possible to use bulk optical parametric amplifiers but these amplifiers are relatively complex to align and remain very bulky.

Some years ago, it was thus proposed to produce devices known as FOPCPAs, mentioned above, to combine the advantages of optical parametric amplifiers and fibre amplifiers.

This theoretical research was rapidly confirmed with experiments conducted:

firstly, at telecommunication wavelengths with picosecond signals, for the purposes of simplicity and to demonstrate the feasibility of such devices—see the following document:

[1] C. Caucheteur, D. Bigourd, E. Hugonnot, P. Szriftgiser, A. Kudlinski, M. Gonzalez Herraez and A. Mussot, "Experimental demonstration of optical parametric chirped pulse amplification in optical fiber", Opt. Lett., vol. 35, No. 11, pp. 1786-1788 (2010)

then around 1 μm with femtosecond pulses—see the following document:

[2] D. Bigourd, L. Lago, A. Mussot, A. Kudlinski, J. F. Gleyze and E. Hugonnot, "High-gain optical-parametric chirped-pulse amplification of femtosecond pulses at 1 μm", Opt. Lett., vol. 35, No. 20, pp. 3480-3482 (2010).

All these experimental or theoretical demonstrations were performed with a degenerated design, wherein the photons from the same pump source are yielded to the signal wave and to the idler wave.

It should be noted at this point that, in the invention, the use of a non-degenerated design with two pump sources is proposed, wherein the support of the spectrum of the wave to be amplified contains the (arithmetic) mean of the (optical) frequencies of the two pump sources, making it possible to broaden the bandwidth, or gain band, of the amplifier.

In addition, it is even possible to double this bandwidth when the wave to be amplified is approximately injected at the centre of the two pumps, i.e. when the midpoint of the spectrum support coincides approximately with the mean of the frequencies.

The operating principle of known fibre parametric amplifiers is illustrated schematically in FIGS. 1 and 2. In these figures, the (optical) frequency f is given on the x-axis and the power spectral density d on the y-axis (logarithmic scale).

In the degenerated case (FIG. 1) where there is only one pump (pump signal P, having the (optical) frequency fP), the signal S to be amplified is injected into the gain band B1-B2, at the high-frequency (B2) or low-frequency (B1) end. The output of the optical fibre F features the signal wave Sa, which has been amplified during the propagation thereof in the fibre, and the idler wave C which is symmetric to the signal Sa relative to the pump P.

In a non-degenerated design (FIG. 2) where there are two pumps (pump signals P1 and P2, having respective (optical) frequencies fP1 and fP2, where fP1 is less than fP2), the principle is similar.

The gain band B is then between the two pumps; and the axis M (corresponding to an (optical) frequency fM equal to (fP1+fP2)/2), equidistant from P1 and P2, forms an axis of symmetry for B.

The signal to be amplified S is in turn injected on a spectral half-band between fM and the frequency of one of the pumps, i.e. fP1 in the example in FIG. 2. And, the idler wave C is generated on the other spectral half-band, between fM and fP2 in the example in FIG. 2.

The main problem addressed by these designs is in that it is generally only possible to use half of the potential gain band. Indeed, the other half is reserved for the idler wave which is generated during the propagation of the signal.

Moreover, the injection of waves from both sides (signal and idler wave) is possible in a so-called "phase-sensitive" design (potentially capable of amplifying without noise). However, this requires extremely delicate control of the phase of each of the waves involved, this control not being possible to be carried out in a stable manner.

It is also possible to make use of the entire gain bandwidth simultaneously, by injecting a plurality of monochromatic waves wherein the spectral shifts are adjusted such that the idler waves generated are not overlaid—see the following document:

[3] A. Durecu, C. Simonneau, A. Mussot, T. Sylvestre, E. Lantz, H. Maillotte, "Fiber optical parametric amplifier and method for amplification of optical signals with a fiber optical parametric amplifier", European patent application EP 1 626 308, published on 15 Feb. 2006.

However, this design is limited to quasi-monochromatic waves. Further, spectral gaps must be left "free" and as such limit the spectral band that actually can be used.

In view of the technical limitations associated with fibres or pump powers, it is thus particularly relatively difficult to amplify pulses having a spectrum extending over more than 10 nm in the region of 1 μm.

DESCRIPTION OF THE INVENTION

The aim of the present invention is that of remedying the above drawbacks.

Specifically, the present invention relates to a method for the optical parametric chirped pulse amplification, using a first pump signal, having a first optical frequency, characterised in that a four-wave mixing effect is used between each chirped pulse, the first pump signal and a second pump signal, having a second optical frequency, and in that the half-sum of the first and second optical frequencies pertains to the support of the spectrum of the chirped pulses.

The present invention also relates to a device for the optical parametric chirped pulse amplification, comprising:
 a first pump source for supplying a first pump signal, having a first optical frequency,
 a light pulse source,
 a stretcher for temporally stretching the light pulses and thus supplying the chirped pulses, and
 a medium for amplifying the chirped pulses,
 characterised in that it further comprises a second pump source for supplying a second pump signal, having a second optical frequency, in that the medium is suitable for producing a four-wave mixing effect between each chirped pulse and the first and second pump signals, and in that the half-sum of the first and second optical frequencies pertains to the support of the spectrum of the chirped pulses.

According to one preferred embodiment of the device according to the invention, the half-sum of the first and second optical frequencies coincides approximately with the midpoint of the support of the spectrum of the chirped pulses.

Preferably, half of the spectral distance between the first and second pump signals is less than or equal to the amplitude of the support of the spectrum of the chirped pulses.

In the present invention, the medium suitable for producing the four-wave mixing effect is preferably an optical fibre. In addition, this optical fibre is preferably a photonic crystal fibre.

According to a first particular embodiment of the invention, the first and second pump signals are continuous.

According to a second particular embodiment, at least one of the first and second pump signals is pulsed.

In particular, each of the first and second pump signals may be pulsed.

BRIEF DESCRIPTION OF THE DRAWINGS

The present invention will be understood more clearly on reading the description of examples of embodiments given hereinafter, merely indicatively and in no way exhaustively, with reference to the appended figures wherein.

DETAILED DESCRIPTION OF PARTICULAR EMBODIMENTS

Figure 1:
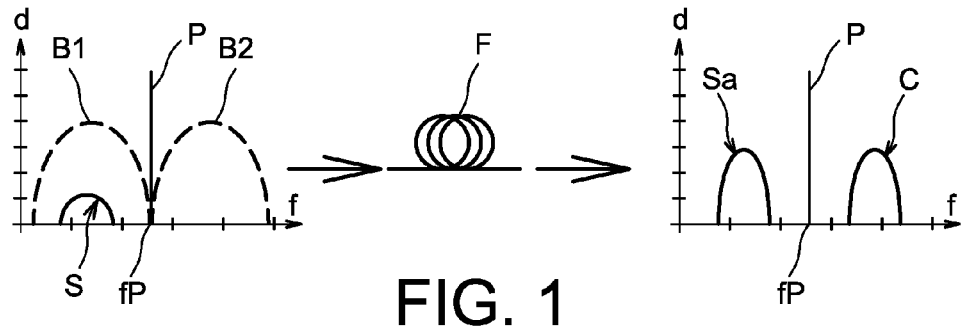
FIG. 1 illustrates schematically the operating principle of a known optical parametric amplifier, comprising a single pump source, and has already been described.
Figure 2:
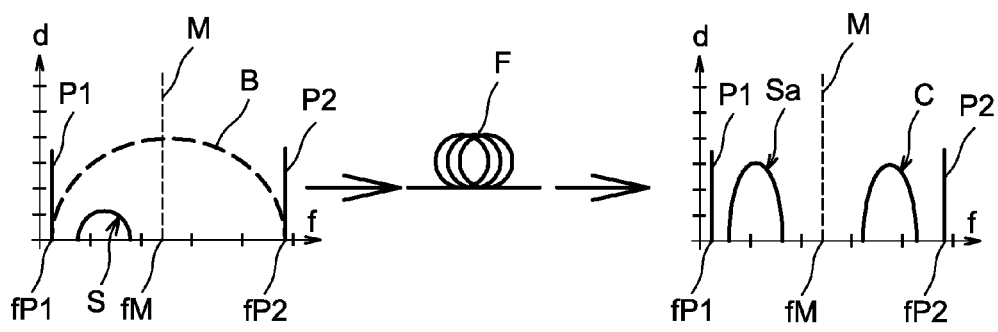
FIG. 2 illustrates schematically the operating principle of a known optical parametric amplifier, comprising two pump sources, and has already been described.
Figure 3:
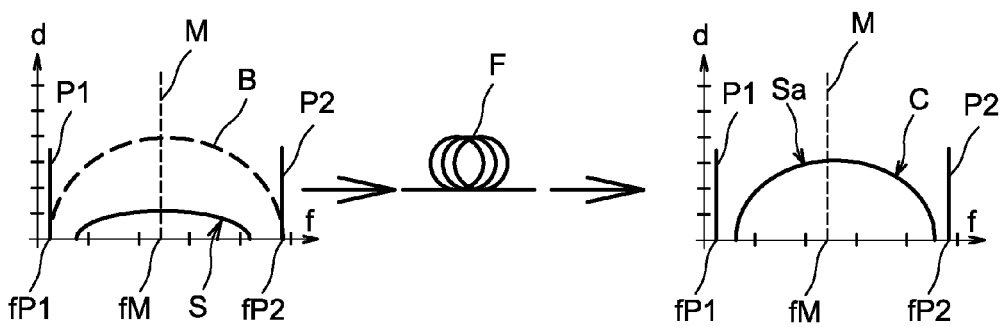
FIG. 3 illustrates schematically the operating principle of a particular embodiment of the device, according to the invention.

FIG. 3 illustrates schematically the operating principle of an example of the device for the optical parametric chirped pulse amplification, according to the invention, wherein two pump sources and an optical fibre are again used.

In FIG. 3, the (optical) frequency f is again given on the x-axis and the power spectral density d on the y-axis (logarithmic scale).

P1 again denotes a first pump signal, P2 a second pump signal, fP1 the (optical) frequency of P1, fP2 the (optical) frequency of P2, B the gain band, M the axis equidistant from P1 and P2, fM the (optical) frequency corresponding to M, S the signal to be amplified, F the optical fibre, Sa the amplified signal during the propagation thereof in the fibre and C the idler wave.

In the example in question, the input signal S (signal with frequency drift) is positioned at the centre of the two pumps. More specifically, the spectrum of S allows M as the axis of symmetry, and the carrier of this spectrum is included in the interval [fP1; fP2].

In this way, the midpoint of this carrier coincides with (fP1+fP2)/2. The signal S thus overlaps with the sides of the gain band B which are usually reserved for the signal and the idler wave respectively. In this case, a factor of 2 is thus gained on the gain band.

It can also be seen that the amplified signal Sa and the idler wave C both occupy a frequency range having fM as a midpoint.

In this way, the idler wave is overlaid on the signal during amplification. However, during recompression (following amplification), the amplified signal is compressed but the idler wave is not: on the contrary, it is stretched somewhat further since the frequency drift thereof is opposite that of the amplified signal.

In terms of phase (and as a first approximation), during stretching, a phase $\phi$ is added to the signal (and there is no idler wave). During amplification, the signal retains this phase $\phi$ and the idler wave appears, with the phase $-\phi$. During compression, the phase of the signal decreases by a value $\phi$ hence a zero phase shift relative to the signal before stretching. The phase of the idler wave also decreases by this value $\phi$ hence a phase shift $-2\phi$ relative to the signal.

The idler wave is thus not compressed and merely conveyed by a noise consisting of a base of the recompressed signal.

It is thus possible to amplify a short chirped pulse using the entire bandwidth of the FOPCPA if a base is accepted for the amplified and recompressed pulse.

It should be noted that the use of the entire bandwidth enables the amplification of very short pulses.

To demonstrate the feasibility of the invention, the operation of an amplifier, of the type in the example described, was simulated by means of a model using a nonlinear Schrödinger equation, this model having been validated for chirped pulses, during experiments using a single pump—see the following document:

[4] D. Bigourd, L. Lago, A. Kudlinski, E. Hugonnot and A. Mussot, "Dynamics of fiber optical parametric chirped pulse amplifiers", JOSA B, vol. 28, No. 11, pp. 2848-2854 (2011).

Figure 4:
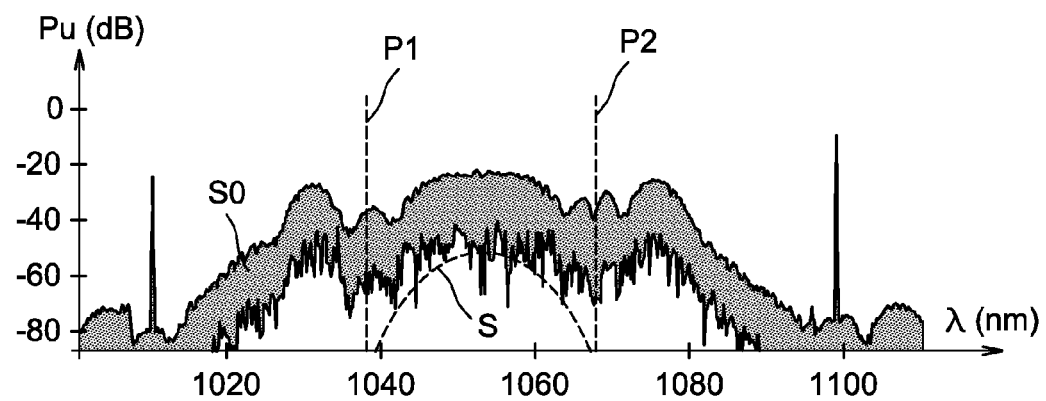
FIGS. 4 to 6 illustrate schematically digital simulations of an example of the invention (FIG. 4: input and output spectra, FIG. 5: gain curve progression, and FIG. 6: input signal before stretching and after stretching, amplification and recompression)
Figure 5:
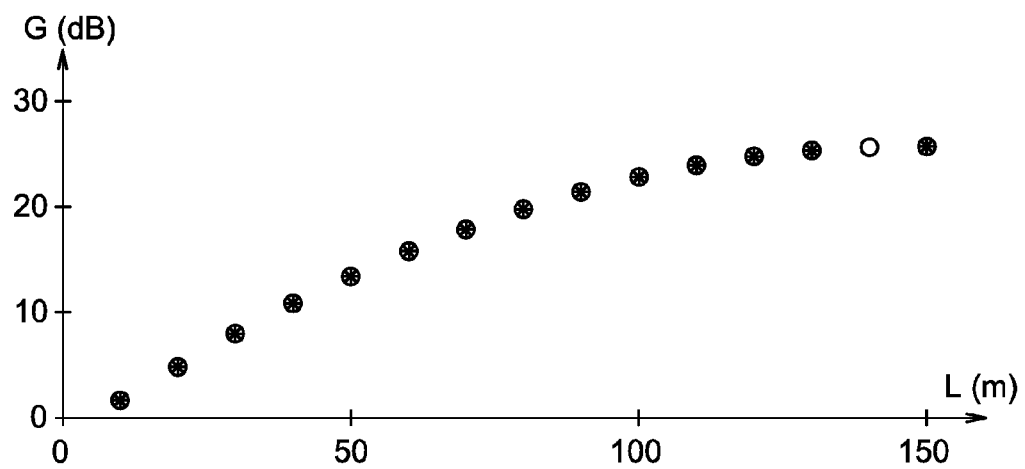
Figure 6:
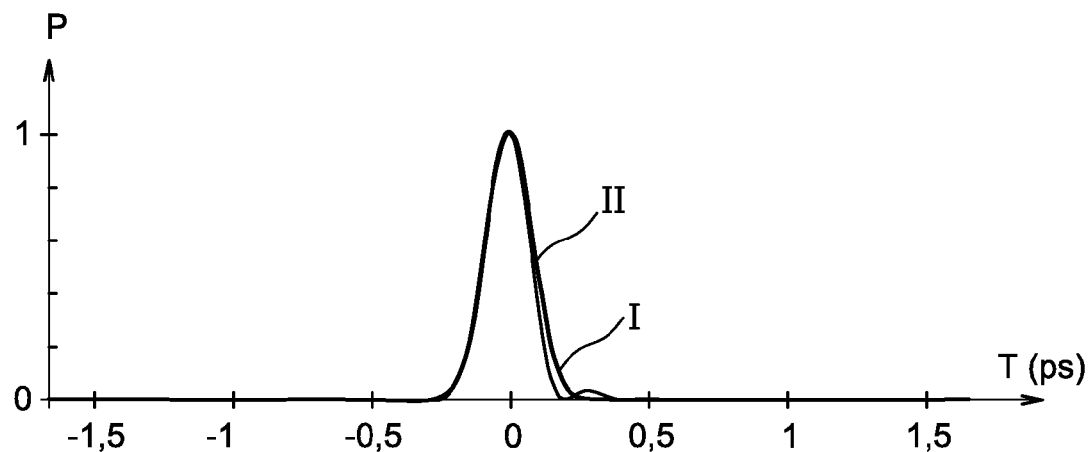

The digital simulations are schematically illustrated by FIGS. 4 to 6. In FIGS. 4 and 6, the powers were standardised to 1 for more clarity. The median pulsation between the two pumps is annotated $\omega_c$: $\omega_c = \pi(fP1+fP2)$. In addition, an optical fiber is used for which:

the nonlinear coefficient $\gamma$ equals 9/W/km, the second-order dispersion coefficient $\beta_2(\omega_c)$ equals $-2.05 \times 10^{-29}$ s$^2$/m, the third-order dispersion coefficient $\beta_3(\omega_c)$ equals $0.79 \times 10^{-40}$ s$^3$/m, the fourth-order dispersion coefficient $\beta_4(\omega_c)$ equals $2.5 \times 10^{-55}$ s$^4$/m, and the power of each of the two pump signals equals 3 W.

FIG. 4 shows an example of a spectrum at the fibre input (dotted lines) for a signal of 200 fs stretched to 4.5 ns and positioned at the centre of the two pumps. The latter are spaced from each other by 8 THz. The wavelengths $\lambda$ (nm) are given on the x-axis and the powers Pu on the y-axis (20 dB per division).

After propagating the signal in the fibre (length greater than 150 m), the output spectrum SO is obtained. It is observed that the signal is indeed amplified. Furthermore, after filtering this signal spectrally to separate same from the residual pump signals, it is observed that the energy amplification gain equals 26 dB.

The longitudinal progression of this gain is represented in FIG. 5. The length of fibre L(m) is given on the x-axis and the gain G(dB) on the y-axis. It is observed that this gain is quasi-exponential on a first part of the fibre and that it subsequently starts to saturate. This behaviour is similar to that observed with systems with a single pump.

In FIG. 6, the time T(ps) is given on the x-axis and the power P (arbitrary unit) on the y-axis. The input signal before stretching is represented by the curve I. The temporal shape of this signal after stretching, amplification and recompression is given by the curve II.

It can be seen that the output signal (II) is quasi-identical to the input signal (I). This demonstrates that no parasitic phase was added during the amplification process.

In conclusion, the main advantage of the invention is in that it makes it possible to double the gain bandwidth of a FOPCPA comprising two pumps.

It should be noted that a FOPCPA with two pumps had never previously been disclosed and that the use of both sides of the gain band is novel: those skilled in the art would be prompted, as in conventional FOPA designs with two pumps, to only use half of this gain band.

Indeed, in the case of a parametric amplifier, it is known to inject a wave both from the signal side and the idler wave side when seeking to amplify monochromatic signals. This is referred to as a phase-sensitive design. Such a design is potentially capable of amplifying without noise, but requires delicate control of the phase of each of the waves in question.

In the case of pulses with frequency drift which are for example positioned at the centre of the two pumps, the phases are set by the stretching device. It is thus completely counterintuitive to obtain a significant gain in this case.

Figure 7:
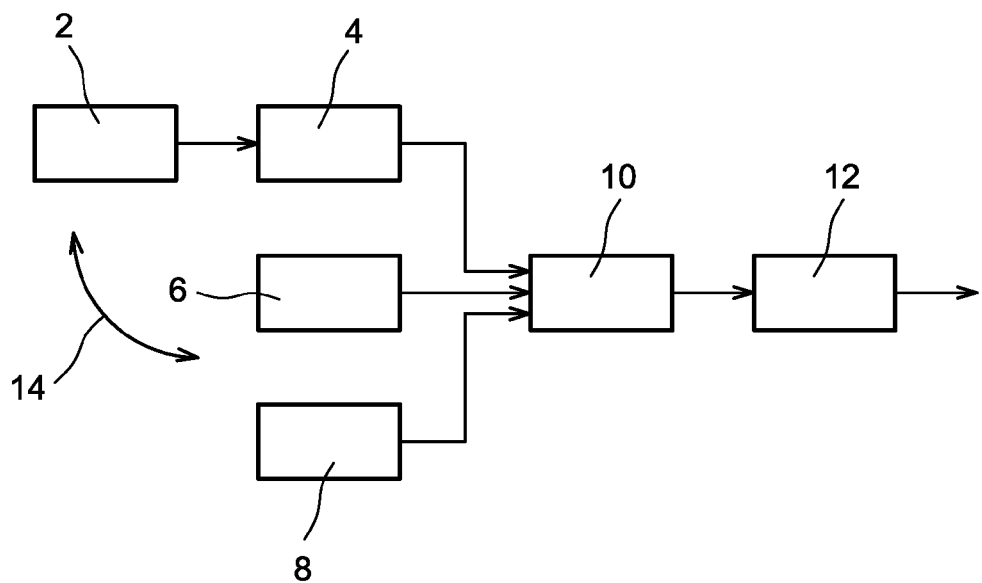
FIG. 7 is a schematic view of a particular embodiment of the device, according to the invention.

FIG. 7 is a very schematic view of a particular embodiment of the device, according to the invention.

It consists of a FOPCPA comprising:

a source 2 of light pulses, which is a mode locking oscillator for example, a stretcher 4 for temporally stretching the pulses and thus supplying the chirped pulses, a first pump source 6 supplying pulsed pump signals wherein the optical frequency is annotated fP1, a second pump source 8 supplying pulsed pump signals wherein the optical frequency is different to fP1 and annotated fP2, an optical fibre 10 receiving the pump signals supplied by the sources 6 and 8 and amplifying the chirped pulses, producing a four-wave mixing effect between same and the pump signals.

The device is followed by a compressor 12 for temporally compressing the amplified pulses.

The pulses compressed in this way are sent to a device (not shown) where they are used.

The duration of the pulses before the stretcher 4 is of the order of 1 ns or less. It typically ranges from a few femtoseconds to a few picoseconds.

The pulsed pump signals, supplied by the sources 6 and 8, are synchronised with the pulses supplied by the source 2 using means symbolised by the double arrow 14 in FIG. 7. Such synchronisation means are already known for FOPAs.

In one alternative embodiment of the device represented in FIG. 7, only one of the two sources 6 and 8 supplies pulsed pump signals. The other source supplies continuous pump signals.

In a further alternative embodiment, each of the two sources 6 and 8 supplies continuous pump signals. In this case, the synchronisation means 14 are not used.

According to the invention, (fP1+fP2)/2 pertains to the support of the spectrum of the pulses with frequency drift. In the example in question, (fP1+fP2)/2 coincides with the midpoint of this support, and |fP2−fP1|/2 (i.e. half of the spectral distance |fP2−fP1|) is less than or equal to the amplitude of this support.

However, preferably, it is ensured that the pulse spectrum support uses the entire amplification spectral band [fP1; fP2] (assuming fP1 is less than fP2).

It should be noted that, given the pulses to be amplified, the FOPCPA design is adjusted to these pulses. In other words, the fibre 10 and the pump sources 6 and 8 are chosen according to these pulses. In practice, the pump sources are adjustable and are adjusted to the pulses to be amplified.

The optical fibre 10 is preferably a microstructured optical fibre, allowing greater scope for the fibre design.

Furthermore, it is advantageous to use an optical fibre since very significant nonlinear coefficient can be obtained therewith and it is known how to adjust the dispersion properties thereof. However, it should be noted that the fibre 10 could be replaced by any third-order nonlinear medium, suitable for producing a four-wave mixing effect between the chirped pulses and the pump signals supplied by the sources 6 and 8.

The invention claimed is:

1. A method for optical parametric chirped pulse amplification, comprising:
    providing chirped pulses,
    using a first pump signal having a first optical frequency,
    using a second PUMP signal having a second optical frequency,
    using a four-wave mixing effect between each chirped pulse, the first pump signal and the second pump signal, wherein
    the half-sum of the first and second optical frequencies pertains to the support of the spectrum of the chirped pulses.

2. A device for the optical parametric chirped pulse amplification, comprising:
    a first pump source for supplying a first pump signal having a first optical frequency,
    a second pump source for supplying a second pump signal having a second optical frequency,
    a light pulse source,
    a stretcher for temporally stretching the light pulses and thus supplying the chirped pulses, and
    a medium for amplifying the chirped pulses,
    wherein the medium is suitable for producing a four-wave mixing effect between each chirped pulse and the first and second pump signals, and wherein the half-sum of the first and second optical frequencies pertains to the support of the spectrum of the chirped pulses.

3. A device according to claim 2, wherein the half-sum of the first and second optical frequencies coincides approximately with the midpoint of the support of the spectrum of the chirped pulses.

4. A device according to claim 2, wherein half of the spectral distance between the first and second pump signals is less than or equal to the amplitude of the support of the spectrum of the chirped pulses.

5. A device according to claim 2, wherein the medium suitable for producing the four-wave mixing effect is an optical fibre.

6. A device according to claim 5, wherein the optical fibre is a photonic crystal fibre.

7. A device according to claim 2, wherein the first and second pump signals are continuous.

8. A device according to claim 2, wherein at least one of the first and second pump signals is pulsed.

9. A device according to claim 8, wherein each of the first and second pump signals is pulsed.

* * * * *